US011804199B2

(12) United States Patent
Risinger

(10) Patent No.: US 11,804,199 B2
(45) Date of Patent: Oct. 31, 2023

(54) COLOR CONTROL SYSTEM FOR PRODUCING GRADIENT LIGHT

(71) Applicant: Chromis Animations, Ltd., Lafayette, CO (US)

(72) Inventor: James A. Risinger, Lafayette, CO (US)

(73) Assignee: Chromis Animations, Ltd., Lafayette, CO (US)

( * ) Notice: Subject to any disclaimer, the term of this patent is extended or adjusted under 35 U.S.C. 154(b) by 0 days.

(21) Appl. No.: 16/816,140

(22) Filed: Mar. 11, 2020

(65) Prior Publication Data
US 2020/0294466 A1 Sep. 17, 2020

Related U.S. Application Data

(60) Provisional application No. 62/817,541, filed on Mar. 12, 2019.

(51) Int. Cl.
  *G09G 5/02* (2006.01)
  *G09G 5/10* (2006.01)
(52) U.S. Cl.
  CPC ............... *G09G 5/026* (2013.01); *G09G 5/10* (2013.01); *G09G 2320/0271* (2013.01); *G09G 2320/0666* (2013.01)
(58) Field of Classification Search
  CPC ........ G09G 5/026; G09G 3/14; H05B 47/155; H05B 47/165; H05B 45/20
  See application file for complete search history.

(56) References Cited

U.S. PATENT DOCUMENTS

| | | | |
|---|---|---|---|
| 4,157,566 A * | 6/1979 | Nakabe ................. | H04N 9/077 348/242 |
| 7,352,339 B2 | 4/2008 | Morgan et al. | |
| 8,476,844 B2 | 7/2013 | Hancock et al. | |
| 2002/0050518 A1* | 5/2002 | Roustaei ............ | G06K 7/10544 235/454 |
| 2008/0024076 A1* | 1/2008 | Korcharz ............... | H05B 45/20 315/308 |
| 2008/0158871 A1 | 7/2008 | McAvoy et al. | |
| 2012/0229032 A1* | 9/2012 | Van De Ven ......... | H05B 45/20 315/151 |
| 2015/0332653 A1* | 11/2015 | Kakinuma ............. | H04N 1/628 345/600 |

* cited by examiner

*Primary Examiner* — Samantha (Yuehan) Wang

(57) ABSTRACT

Various embodiments of the present technology generally relate to technology for controlling diodes and producing colored light displays. More specifically, some embodiments of the present technology relate to controlling one or more diodes individually capable of producing multiple colors of light and producing various colors of light in said diodes. In some embodiments, a color control software instructs a set of diodes to produce smooth gradients between adjacent colors in a color sequence. In additional embodiments, a color control system instructs the set of diodes to display smooth transitions between color sequences.

20 Claims, 13 Drawing Sheets

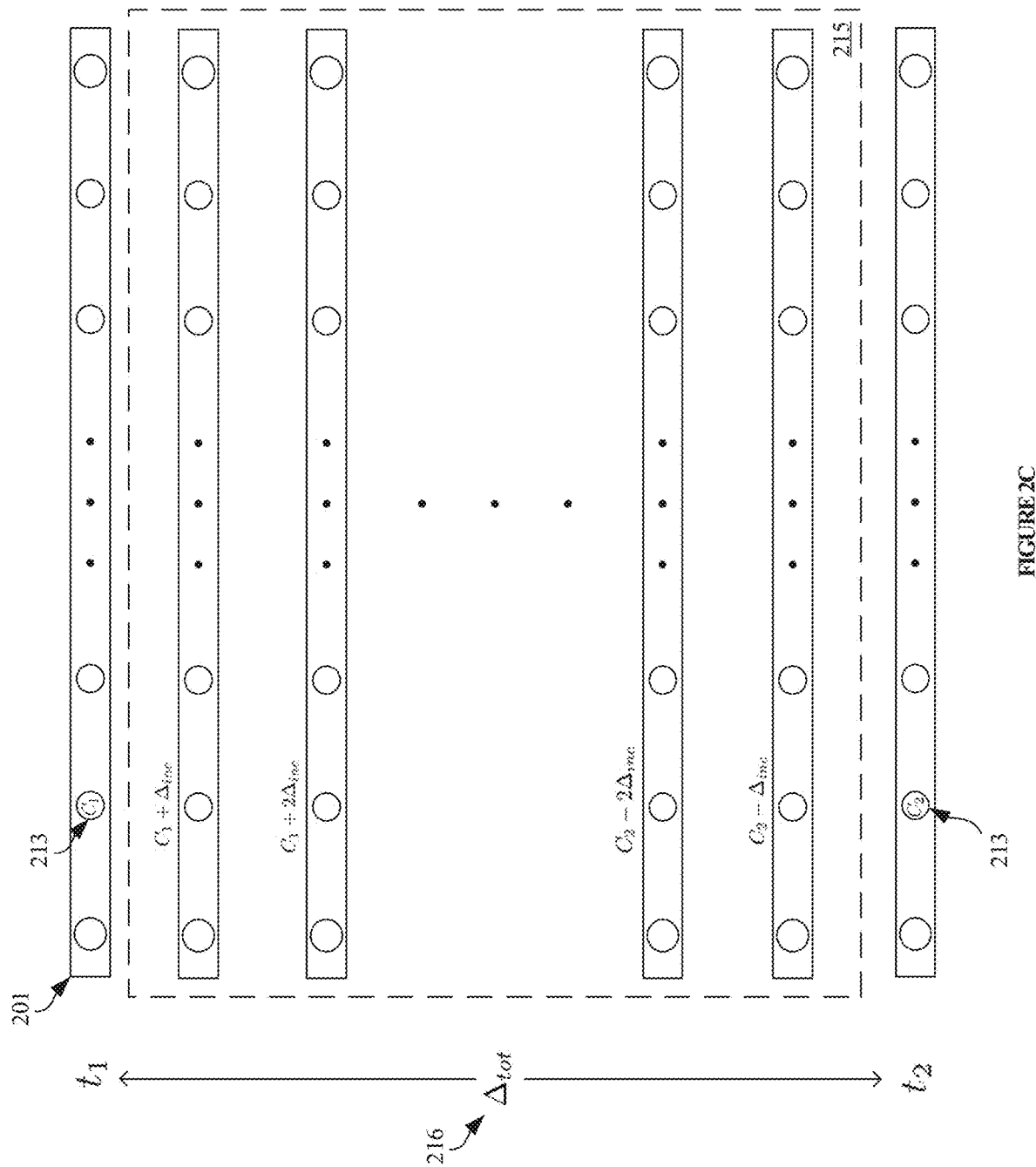

COLOR CONTROL SYSTEM FOR PRODUCING GRADIENT LIGHT

CROSS-REFERENCE TO RELATED APPLICATIONS

This application claims priority to U.S. Provisional Application Ser. No. 62/817,541 filed Mar. 12, 2019, which is incorporated herein by reference in its entirety for all purposes.

TECHNICAL FIELD

Various embodiments of the present technology generally relate to technology for controlling diodes to produce colored light. More specifically, some embodiments of the present technology relate to controlling one or more diodes capable of producing multiple colors of light to produce smooth gradients between adjacent colors in a sequence and smooth transitions between color sequences.

BACKGROUND

Colored lighting is used in a variety of personal, commercial, entertainment, and other visual display purposes. Light-emitting diodes (LEDs) are a common product used for colored light displays. Generally, LEDs are intended for situations in which light may travel directly from a light source to the human eye. One form of colored LED lighting is red-green-blue (RGB) lighting wherein LEDs combine red, green, and blue to produce different hues of light. Other methods may be used to produce a large spectrum of colored light instead of or in addition to RGB lights. Examples of such scales include hue-saturation-value (HSV), hue-saturation-lightness (HSL), Hex, cyan-maroon-yellow-black (CMYK), and other representations of the visual color spectrum.

Red, green, and blue are the three basic colors that can be used to produce any other color. Using lights of these three colors can create a color space that encompasses all colors in the red-green-blue (RGB) color space. The set of all possible colors is called the "gamut." RGB color space is any additive color space based on an RGB color model.

LEDs can be customized to display a wide variety of RGB colors. LEDs can be programmable to allow them to display desired colors on the RGB scale. LED strips are strips of multiple LEDs. LED strips can be programmable in a non-addressable manner or an addressable manner. In an addressable RGB LED strip, each LED is capable of displaying an RGB color and each LED can be controlled individually. Common applications of RGB LED strips may include light displays for visual pleasure in an individual's home, outdoor lighting, in a vehicle, at a concert, and other applications for colored lighting.

It is with respect to this general technical environment that aspects of the present technology disclosed herein have been contemplated. Furthermore, although a general environment has been discussed, it should be understood that the examples described herein should not be limited to the general environment identified in the background.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various embodiments herein relate to systems, software, and processes for light display applications. In some embodiments, the systems, software, and processes implement a gradient smoothing technique that creates smooth transitions between colors displayed on a lighting strip to create an aesthetically pleasing appearance for a viewer. In some embodiments, the systems, software, and processes apply the gradient smoothing technique over time to create a smooth transition from one color sequence to another color sequence. The lighting strip may be in communication with a computing system configured to identify a plurality of colors to produce in a plurality of diodes on the lighting strip. In at least one embodiment, a system comprises a plurality of LEDs and a controller operatively coupled with one or more of the LEDs from the plurality of LEDs. The controller in the at least one embodiment may be configured to identify a plurality of colors to produce in the plurality of LEDs. For at least one LED in the plurality of LEDs, the controller may be further configured to identify a color for the LED to produce based on factors comprising a number of LEDs in the plurality of LEDs and a difference between a first color of the plurality of colors and a second color of the plurality of colors. The controller may be further configured to instruct the LED to produce the color. In some embodiments the factors may further comprise a desired gradient.

In some embodiments, the system may then identify a subsequent plurality of colors to produce in the plurality of LEDs. For the at least one diode in the plurality of LEDs, the system identifies a subsequent color for the LED based on subsequent factors comprising a difference between the subsequent color and a present color of the LED. The system instructs the LED to transition from producing the present color to producing the subsequent color. In some embodiments, instructing the LED to transition from producing the present color to producing the subsequent color is based on an identified transition duration.

BRIEF DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 2C illustrates an example of a lighting strip transitioning to a new color sequence over time in accordance with some embodiments of the present technology;

Figure 1:
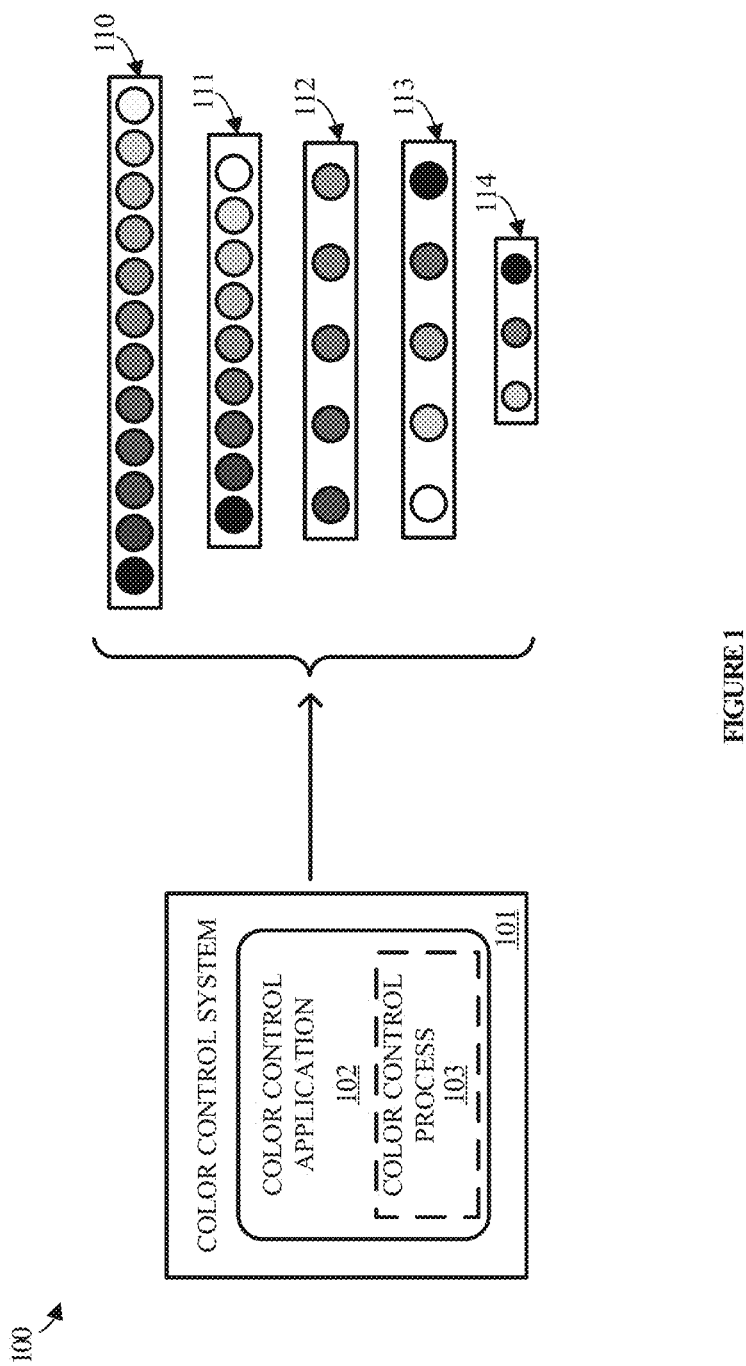
FIG. 1 illustrates an example of an environment in which some embodiments of the present technology may be utilized.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Various embodiments of the present technology generally relate to a system for controlling and producing colored light. More specifically, some embodiments relate to blending light in a manner that creates smooth gradients between colors. The present technology can advantageously create a smooth transition between adjacent colors and may also create smooth transitions over time from one color sequence to the next. In certain embodiments a user may provide input for desired characteristics comprising colors, patterns, smoothness, and brightness. In some embodiments, a user may input an image into a user interface to extract colors from the image to produce in a light display.

Red, green, and blue are the three basic colors that can be combined to make other colors possible. Using lights of these three colors can create a color space that encompasses all colors in the red-green-blue (RGB) color space. By applying a specific set of the colors, other colors can be made. For example, if the red, green, and blue lights are all on at the same intensities, white light is produced. By turning on red and green, yellow light is produced. Dimming the green light may cause the light to become more orange. The set of all possible colors is called the "gamut." In reference to the present technology, RGB color space refers to any additive color space that is based on an RGB color model.

Colored light can be created with several varieties of diodes. One of the most common ways to produce colored light is with light emitting diodes (LEDs). RGB LEDs are one of the most common sources of LEDs, and their use is anticipated as an application of the present technology. Laser Diodes are another form of colored light producing diode that may be used in accordance with embodiments of the present technology, and their use is anticipated. Other methods of producing colored light on an individually-programmable basis exist and are anticipated.

Additionally, RGB is not the only color space capable of producing many different hues of color. Other methods may be used to produce a large spectrum of colored light instead of or in addition to RGB lights. Examples of such scales include hue-saturation-value (HSV), hue-saturation-lightness (HSL), Hex, cyan-maroon-yellow-black (CMYK), and other representations of the visual color spectrum. In some embodiments, a user may wish to display only one color across a light strip. The present technology allows for and comprises such an embodiment.

In some embodiments, a color gradient producing system identifies a plurality of colors to produce in a plurality of diodes. For at least one diode in the plurality of diodes, the system may identify a color for the diode to produce based on factors comprising a number of diodes in the plurality of diodes and a difference between a first color or the plurality of colors and a second color in the plurality of colors. The system then instructs the diode to produce the color. The factors may further comprise a desired gradient between the first color and the second color and the desired gradient may comprise a linear gradient or a non-linear gradient. In certain embodiments, the diode comprises a laser diode. Identifying the color for the diode may comprise identifying RGB values and producing the color may comprise emitting red, green, and blue light according the RGB values. An RGB value consists three components: a red component, green component, and a blue component. Each RGB value components comprises a value between 0 and 255. When all three values are zero, black is produced. When all three values are 255, white is produced. By combing different values of red, green, and blue light, different hues of color are produced. Other color scales exist and have similar methods of creating hues.

In some embodiments, the color gradient producing system further identifies a subsequent plurality of colors to produce in the plurality of diodes. For the at least one diode in the plurality of diodes, the system identifies a subsequent color for the diode based on subsequent factors comprising a difference between the subsequent color and a present color of the diode. The system then instructs the diode to transition from producing the present color to producing the subsequent color.

In an embodiment, a computing apparatus comprising one or more computer readable media, a processing system operatively coupled with the computer readable media, and program instructions stored on the computer readable media, wherein the program instructions, when read and executed by the processing system, direct the computing apparatus to at least identify a plurality of colors to produce in a plurality of diodes. For at least one diode in the plurality of diodes, the program instructions direct the computing apparatus to identify a color for the diode to produce. Identifying the color is based on factors comprising at least a number of diodes in the plurality of diodes and a difference between a first color of the plurality of colors and a second color of the plurality of colors. The program instructions further direct the computing apparatus to instruct the diode to produce the color.

In some embodiments, the program instructions further direct the computing apparatus to at least identify a subsequent plurality of colors to produce in the plurality of diodes. For the at least one diode in the plurality of diodes, the program instructions direct the computing apparatus to identify a subsequent color for the diode based on subsequent factors comprising a difference between the subsequent color and a present color of the diode. The program instructions then direct the computing apparatus to instruct the diode to transition from producing the present color to producing the subsequent color.

In any of the afore-mentioned embodiments, identifying the plurality of colors to display may comprise extracting the plurality of colors from an input image.

A color gradient represents a set of colors wherein the difference between two adjacent colors in the set is bounded by a tolerance. In certain embodiments of the present technology, the difference between two colors is measured as the Euclidean distance between the two colors in RGB 3-space. RGB 3-space, or RGB color space, is any additive color space that uses three colors, red, green, and blue, to produce all of the possible colors that can be made from combinations of red light, green light, and blue light. By defining a distance between two colors in this manner, a transition between any two colors in the ordered set of colors can be minimized. Aesthetically, this creates transitions between colors that are perceived as smooth. For example, if the colors yellow and blue are to be displayed on an LED light strip, the present technology may calculate the RGB value of each individual light between the two colors to create a smooth color transition between yellow and blue based on how many lights are between the colors in the LED light strip.

A color object is typically represented in a native format as a combination of three numbers, wherein each number represents a percentage of red, green, and blue components of the color. RGB color space can be described as a point in 3-dimensional (3D) space. Thus, the difference between colors can be represented with standard vector subtraction operations. In order to determine a color in RGB color space for a given point, the number of points can be used in a calculation of the color gradient. In some embodiments of the present technology, each given point is an individual LED on an LED light strip and the number of points is the number of LEDs between two colors that are used to create the transition between the two colors. The difference between two colors is calculated as the difference between two vectors in 3-space as follows:

$$C_1 - C_2 = (C_{1.r}, C_{1.g}, C_{1.b}) - (C_{2.r}, C_{2.g}, C_{2.b}) = (C_{1.r} - C_{2.r}, C_{1.g} - C_{2.g}, C_{1.b} - C_{2.b})$$

where $C_1$ and $C_2$ represent color 1 and color 2, respectively, $C_{1.r}$, $C_{1.g}$, and $C_{1.b}$ represent the red, green, and blue values of color 1, respectively, and $C_{2.r}$, $C_{2.g}$, and $C_{2.b}$ represent the red, green, and blue values of color 2, respectively.

In some embodiments of the present technology, a pattern is used to define an ordered set of colors. A pattern represents the colors that are to be displayed on the LED light strip. To display a pattern, the pattern must be formatted to the output width of the light strip, wherein the width is defined by the number of individual LEDs. For example, if a pattern consists of red, white, and blue, then each of the three individual colors are stretched across the light strip to fill the entire width of the LED light strip. LED light strips may comprise any number of individual lights an colors may be displayed on an LED light strip accordingly.

Several options exist when formatting a color pattern to an output light strip. Some of these options include stretching a pattern to fit an entire light strip, repeating portions of a pattern, and constructing a gradient between individual colors of a pattern. If stretching a pattern to fit the entire light strip is desired, each of the colors may be proportionally represented in the output strip. For example, if the pattern is red, blue, purple, then each of the red, blue, and purple would be displayed across the same number of individual lights on the output strip. If the desired output is to repeat portions of the pattern across the light strip, each color may be stretched by a constant factor, so that the entirety of the repeated color pattern may be stretched across the light strip. In this scenario, if showing a pattern across a light strip once without a repetition corresponds to a stretch factor of 1.0, then a new stretch factor may be determined based on the number of repetitions that are desired.

In an exemplary embodiment of the present technology, the desired output requires a blending of colors in a pattern to create a smooth transition between two colors. In the present embodiment, the intermediate spaces between individual colors of the pattern are filled by constructing a linear color gradient between all pairs of adjacent colors in the pattern. Using this method, the original pattern may be stretched to fill the entire output light strip. In another example, a more defined edge may be desired between adjacent colors of a pattern and methods by which a sharper transition is created are included in the present technology.

A gradient is considered herein to be a set of colors combined with a constant size difference between adjacent colors. A gradient can be generated from a pattern by expanding an original pattern to include intervening colors between each of the colors of the original pattern. While a pattern may include any number of colors, in many scenarios, a desired pattern may only include a few different colors. A gradient may be formatted to comprise the same number of colors as lights in the output light strip.

A color gradient is the method by which joining at least two colors in a set using intermediate colors is achieved. The intermediate colors between any two adjacent colors make up a segment. A color set of more than two colors is considered as multiple segments joined together. A color gradient with multiple segments can be mathematically modeled as a piece-wise linear function in accordance with some embodiments of the present technology.

Constructing a gradient from an ordered set of colors requires stretching the colors evenly to a desired size and filling the space between the set of colors with intermediate colors. For example, if the color green is adjacent to the color red in a pattern, each of the lights between the starting color, green, and the ending color, red, is a linear progression between the colors, with a constant change, or delta, between each light. A color may be calculated as the delta to be iteratively applied to the beginning color to result in the ending color. The method described herein can then be performed with respect to each segment in the set of colors in a pattern to yield a resulting color gradient.

For example, a desired pattern comprises two colors, blue and teal. If this pattern is to be displayed as a gradient on a light strip comprising 128 LEDs, then 126 intermediate colors must be generated to construct the gradient between the colors blue and teal. The intermediate colors are constructed by first calculating the total delta between blue and teal. Next, the delta is divided by the number of intermediate steps between the beginning color, blue, and the final color, teal, which in this example is 126 to give an incremental delta value. This calculated value gives a color entity that represents what is added to the beginning color to arrive at the final color in the corresponding number of intermediate steps. Using this method, a linear gradient between any two sets of points in 3D color space can be rendered. If a pattern includes more than two points, for example, blue, teal, and purple, the same method may be applied iteratively for each adjacent pair of colors in the desired pattern to form the gradient.

The above description of gradients can be applied in multiple ways. In some embodiments, the method described above for rendering a color gradient is applied to a physical domain. In a physical domain example, the gradient is calculated in order to display a gradient of a color pattern that is displayed statically on a light strip. Using this method, a color display palette may be created from a set of desired colors in addition to all of the intermediate colors used to blend the adjacent colors in the desired pattern.

In other embodiments, the method described of rendering a color gradient is applied to a time domain. In a time domain example, a gradient is calculated to allow for a smooth transition between a start pattern, displayed at the beginning, and an end pattern, displayed at the end or at any point after the beginning. In the present example, each step in the gradient may provide a subsequent new pattern to display along the entire length of the transition time. Thus, depending on the desired transition duration, the time-dependent gradient method creates the effect of smoothly changing the colors from the start pattern to the end pattern. In the present embodiment, the number of steps is the amount of time specified to transition from the start pattern to the end pattern, divided by the update frequency. The total delta may then be applied at time frequency intervals to achieve the effect of a smooth transition. For example, if a start pattern consists of blue and cyan, and an end pattern consists of red and orange, and a blend duration is specified as 30 seconds, a light strip in accordance with the present example may appear to smoothly transition from the first color set to the second color set according to incremental steps in time. The final pattern, red and orange, may then be completely rendered in 30 seconds. The gradient transition in time may result in a smooth transition between any beginning pattern and any ending pattern. The transition may take place over any period of time including very short (e.g. 50 milliseconds) or very long (e.g. several hours) time scales.

FIG. 1 illustrates an example of color control environment 100 comprising color control system 101, color control application 102, color control process 103, and light strips 110-114, wherein light strips 110-114 comprise light strip 110, light strip 111, light strip 112, light strip 113, and light strip 114. In some embodiments of the present invention, color control system 101 is in communication with one or more of the light strips. Light strips 110-114 serve to demonstrate a plurality of light strips that could be used to display a plurality of color sequences as instructed by color control system 101. Color control system 101 identifies a plurality of colors to be displayed on one or more light strips comprising a plurality of diodes. Color control system 101 identifies a color for at least one diode in a plurality of diodes based on factors comprising a number of diodes in the plurality of diodes and a difference between a first color of the plurality of colors and a second color of the plurality of colors. Color control system 101 instructs the at least one diode to produce the color. In some embodiments of the present technology the one or more light strips comprise LEDs.

In some embodiments, the factors further comprise a desired gradient to be displayed on the one or more light strips. Light strips 110-114 illustrate examples of color gradients that can be displayed on a light strip as instructed by color control application 102. Color control system 101 may determine a color value for one or more diodes in a light strip based on a desired color gradient identified by color control application 102. In certain embodiments, the color value is an RGB value. In some implementations, the desired color gradient comprises a linear gradient. In some implementations, the desired gradient comprises a non-linear gradient.

Figure 2A:
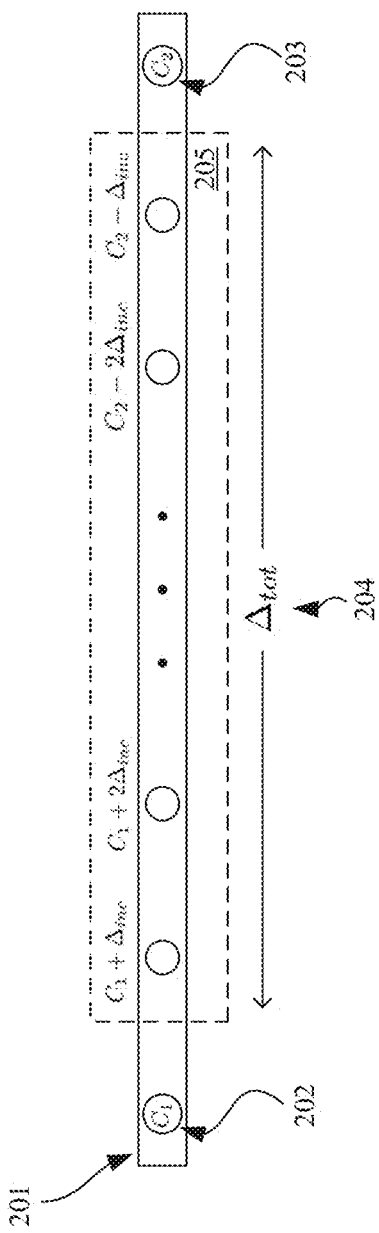
FIG. 2A illustrates an example of a lighting strip displaying a two-color sequence in accordance with some embodiments of the present technology.

FIG. 2A illustrates an example of light strip 201 displaying color values determined by color control application 102 in accordance with some embodiments of the present technology. Color control application 102 may be used to identify diode 202 as color $C_1$ and diode 203 as color $C_2$. In an example of the present technology, a user inputs a two-color color sequence, $C_1$ and $C_2$, and color control application 102 determines a color value for set of diodes 205 between diodes 202 and 203. In the present example, diodes 202 and 203 produce the colors $C_1$ and $C_2$ input by the user. Color control application 102 may then determine a total color value difference, $\Delta_{tot}$ 204, between colors $C_1$ and $C_2$. Color control application 102 may further determine an incremental change, $\Delta_{inc}$, between each diode in set of diodes 205. Color control application 102 can then identify a color value each of the diodes in set of diodes 205 based on a number of diodes in set of diodes 205 and the incremental change between each diode, $\Delta_{inc}$. In the present example, set of diodes 205 displays a linear color gradient between colors $C_1$ and $C_2$ produced by diodes 202 and 203, respectively.

Figure 2B:
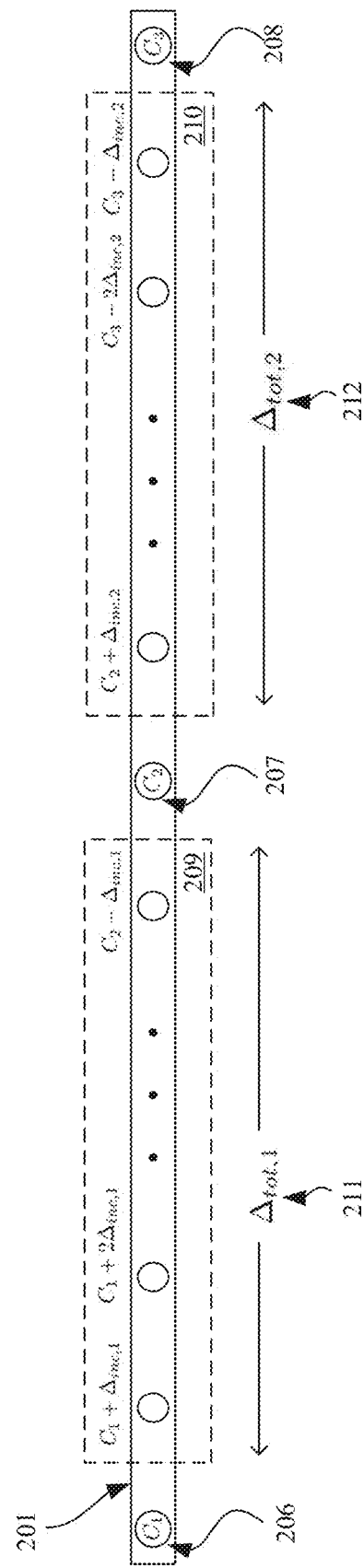
FIG. 2B illustrates an example of a lighting strip displaying a three-color sequence in accordance with some embodiments of the present technology.

FIG. 2B illustrates an example according to an embodiment of the present technology in which light strip 201 is instructed by color control system 101 to display a sequence of three colors evenly spread across light strip 201. The sequence of colors comprises $C_1$, $C_2$, and $C_3$. In the present example, color control system 101 may instruct diodes 206, 207, and 208 to produce colors $C_1$, $C_2$, and $C_3$, respectively. A first set of intermediate diodes, diodes 209 exists between diodes 206 and 207 and a second set of intermediate diodes 210 exists between diodes 207 and 208.

In an example, a user inputs a color sequence comprising $C_1$, $C_2$, and $C_3$, and color control application 102 determines which diodes to instruct to produce $C_1$, $C_2$, and $C_3$, respectively. Color control application 102 may first identify a number of intermediate diodes between diodes 206 and 207 and between diodes 207 and 208. Color control application 102 may then identify the total change in color value between colors $C_1$ and $C_2$, $\Delta_{tot,1}$, and between colors $C_2$ and $C_3$, $\Delta_{tot,2}$. Color control application 102 may further identify an incremental change in color, $\Delta_{inc,1}$, between each diode in diodes 209 based on a number of diodes in diodes 209 and the total change in color value, $\Delta_{tot,1}$. Color control application 102 then identifies an incremental change in color, $\Delta_{inc,2}$, between each diode in the set of diodes 210 based on a number of diodes in the set of diodes 210 and the total change in color value, $\Delta_{tot,2}$. In the present example, color control system 101 may then instruct diodes 209 to produce a linear color gradient between colors $C_1$ and $C_2$ and instructs sets of diodes 210 to produce a linear color gradient between colors $C_2$ and $C_3$.

In other embodiments, color control system 101 may instruct light strip 201 to produce a sequence of colors, wherein the sequence comprises more than three colors. In certain embodiments, color control system 101 instructs light strip 201 to produce to one or more non-linear gradients between adjacent colors in a desired color sequence.

FIG. 2C illustrates an example in accordance with the present technology in which color control system 101 instructs diode 213 in light strip 201 to transition from producing color $C_1$ at time $t_1$ to producing color $C_2$ at time $t_2$. Color control application 102 may be used to identify an intermediate color for diode 213 at each time step between $t_1$ and $t_2$. Color control application 102 can then identify intermediate colors based on the difference between time $t_1$ and $t_2$, the number of steps during the time difference, and the total color difference, $\Delta_{tot}$ 216, between $C_1$ and $C_2$. Based on the listed factors, color control application 102 identifies incremental change, $\Delta_{inc}$, between each intermediate color throughout the transition of diode 213 from color $C_1$ to $C_2$. In the present example, the intermediate colors between $C_1$ and $C_2$ are based on a linear color gradient.

In some embodiments, color control application 102 determines an initial color and an end color for each diode in a plurality of diodes in a light strip. Color control system 101 may instruct each diode to transition from the initial color to the end color over a transition time specified by a user. In some embodiments, initial color and end color of each diode is based on an initial sequence and an end sequence that color control system 101 instructs a plurality of diodes in a light strip 201 to produce.

Figure 3:
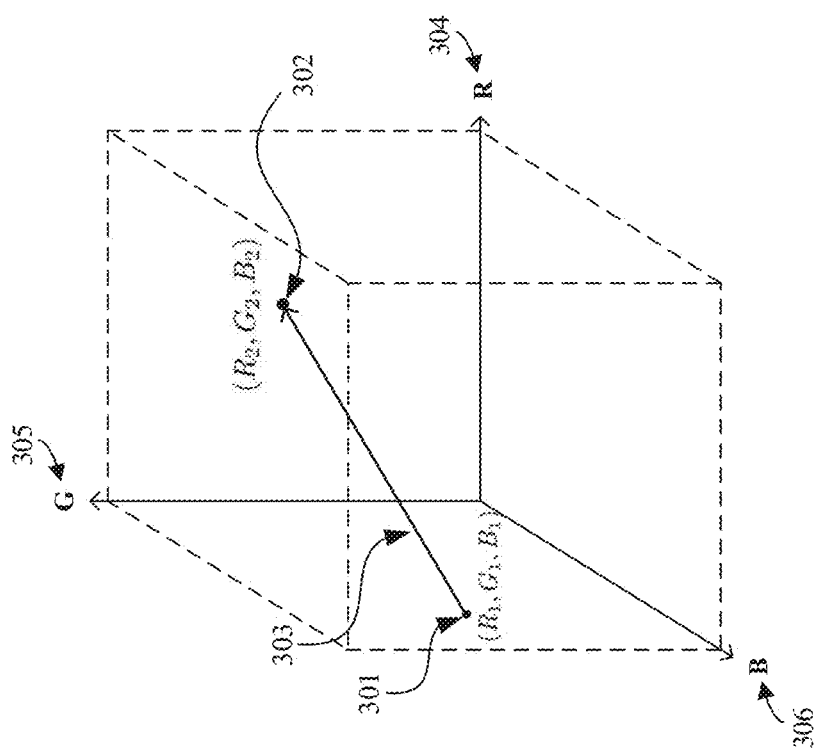
FIG. 3 illustrates an example of a three-dimensional color space which may be used to display a color gradient in accordance with some embodiments of the present technology.

FIG. 3 illustrates an example of determining a difference in RGB three-space. In the present example, a first color with a red, green, and blue component exists at point $(R_1, G_1, B_1)$ 301 and a second color with a red, green, and blue component exists at point $(R_2, G_2, B_2)$ 302. The points exist in RGB three space as illustrated with axes R 304, G 305, and B 306, wherein R, G, and B represent the color components red, green, and blue, respectively. A linear transition from the first color represented by point 301 to the second color represented by point 302 follows vector 303. Color control application 102 may be used to identify a number of points along vector 303 that will be displayed in a set of intermediate colors. In certain embodiments, intermediate points along vector 303 are a set of diodes between two adjacent colors in an identified plurality of colors. In the present example, the adjacent colors are $(R_1, G_1, B_1)$ and $(R_2, G_2, B_2)$. Color control application 102 may be used to identify the number of points along vector 303 to display based on the number of diodes in the set of diodes between the adjacent colors.

In another embodiment, color control application 102 may be used to identify a diode to transition from a first color, $(R_1, G_1, B_1)$, represented by point 301 to a second color, $(R_2, G_2, B_2)$, represented by point 302. The transition steps between the first color and the second color are along vector 303. Color control application 102 may further identify the number of points along vector 303 to display based on an identified transition time and an update frequency for the diode.

Figure 4:
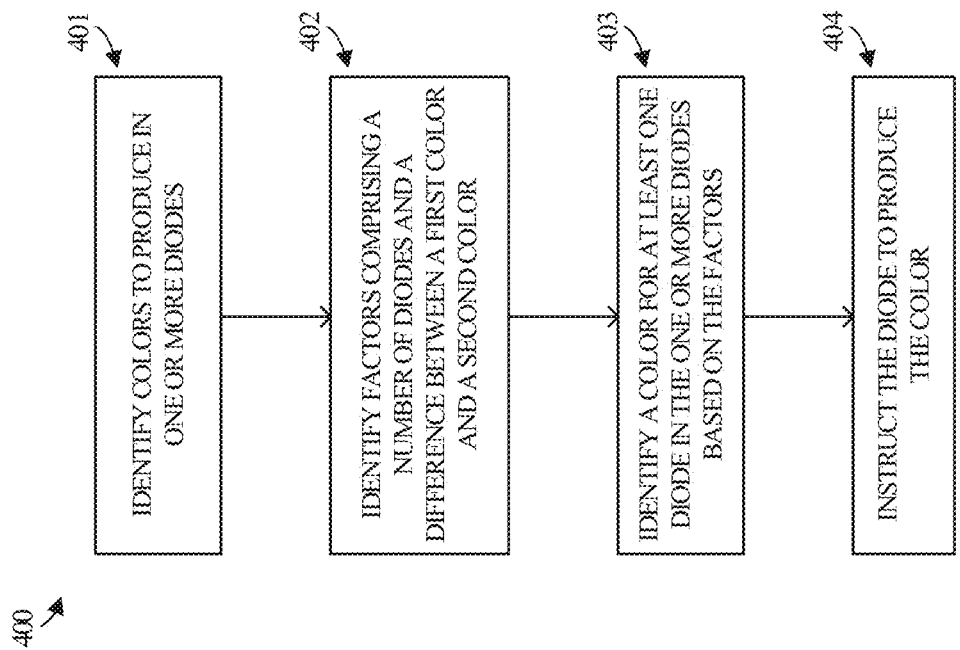
FIG. 4 is a flowchart illustrating a set of operations for producing an identified color in accordance with some embodiments of the present technology.

FIG. 4 is a flowchart illustrating process 400 in accordance with some embodiments of the present technology. In step 401, a color control system identifies a plurality of color to produce in a plurality of diodes. In some implementations, the plurality of diodes is one or more of the set of diodes on light strips 110-114. The plurality of colors may be input by a user into a user interface coupled with the color control system in some implementations. In step 402, the color control system identifies factors comprising a number of diodes and a difference between a first color and a second color. In some implementations, the first color is $C_1$ produced in diode 202 and the second color is $C_2$ produced in diode 203. The number of diodes is the number of diodes in set of diodes 205. In other implementations, the plurality of colors comprises more than two colors, such as the example in FIG. 2B. In the example of FIG. 2B, the color control system identifies a difference between colors C_1 and C_2, $\Delta_{tot,1}$, and a second difference between $C_2$ and $C_3$, $\Delta_{tot,2}$. In step 403, the color control system identifies a color for at least one diode in the plurality of diodes based on the factors comprising a number of diodes and a difference between a first color and a second color. In the example of 2A, the color control system may identify a color for the intermediate diode to the right of diode 202 as $C_1+\Delta_{inc}$. In step 404, the color control system instructs the at least one diode to produce the identified color.

Figure 5:
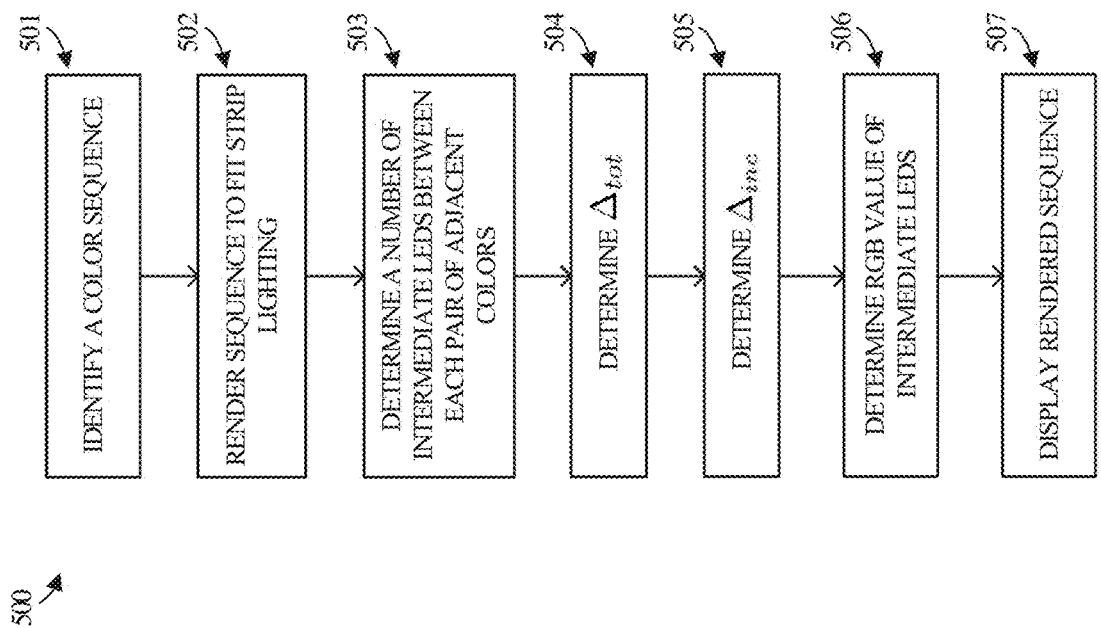
FIG. 5 is a flowchart illustrating a set of operations for displaying a rendered sequence in accordance with some embodiments of the present technology.

FIG. 5 is a flowchart illustrating process 500 in accordance with some embodiments of the present technology. In step 501, a color control system identifies a color sequence. In some implementations, the color sequence is input by a user and comprises a plurality of colors. In step 502, the color control system renders the color sequence to fit a strip of LEDs such as in light strips 110-114. In step 503, the color control system determines a number of intermediate LEDs between at least one pair of adjacent colors in the color sequence. In step 504, the color control sequence determines $\Delta_{tot}$ for the at least one pair of adjacent colors in the color sequence, wherein $\Delta_{tot}$ represents the total difference in RGB color value between the adjacent colors. In step 505, the color control system determines $\Delta_{inc}$ based on the number of intermediate LEDs between the two adjacent colors, wherein $\Delta_{inc}$ represents the incremental change between each adjacent LED in the set up intermediate LEDs. In step 506, the color control system determines an RGB color value for the intermediate LEDs based on $\Delta_{inc}$. In step 507, the color control system instructs the LED strip to display a rendered sequence, wherein the rendered sequence comprises the identified colors of the color sequence and the intermediate colors between adjacent colors in the color sequence.

Figure 6:
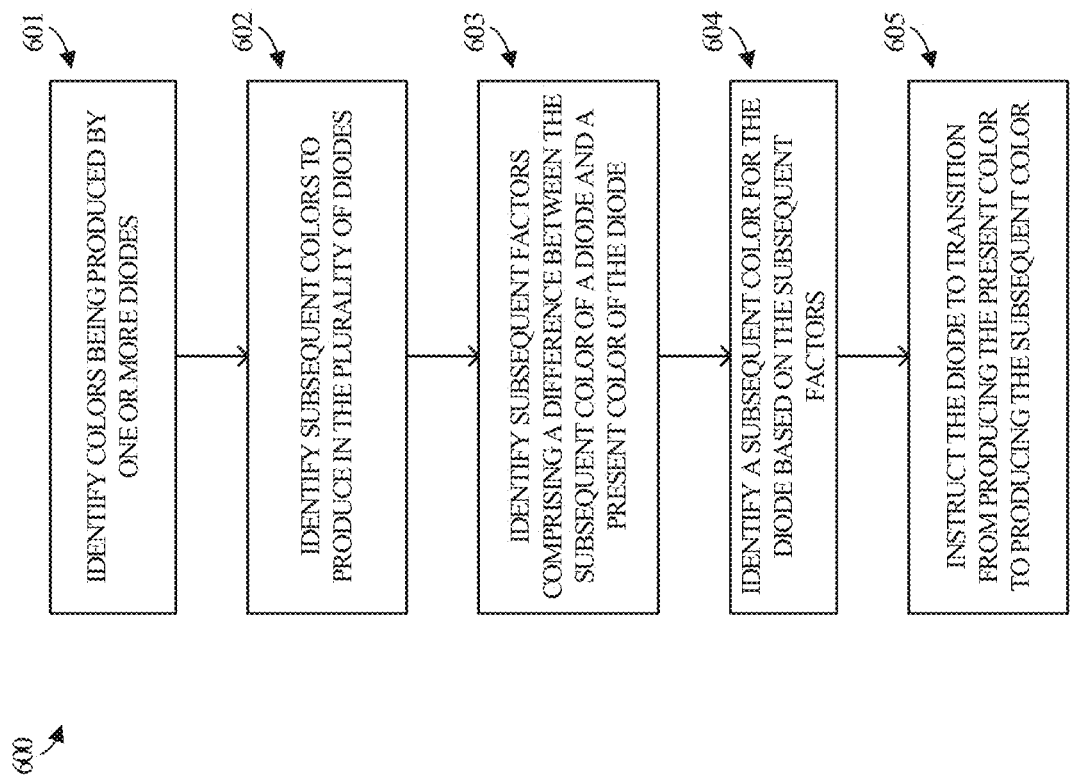
FIG. 6 is a flowchart illustrating a set of operations for transitioning from one color sequence to a sequential color sequence in accordance with some embodiments of the present technology.

FIG. 6 is a flowchart illustrating process 600 in accordance with some embodiments of the present technology. Process 600 generally relates to changing a light strip from displaying a first color sequence to displaying a second color sequence, wherein the transition from the first sequence to the second sequence occurs over a user-designated amount of time in certain examples. In step 601, a color control system identifies a plurality of colors being produced by a plurality of diodes. In step 602, the color control system identifies a subsequent plurality of colors to produce in the plurality of diodes. In step 603, a color control system identifies subsequent factors comprising a difference between the subsequent color of a diode and a present color of the diode. In step 604, the color control system identifies a subsequent color for the diode based on the subsequent factors. In step 605, the color control system instructs the diode to transition from producing the present color to producing the subsequent color.

Figure 7:
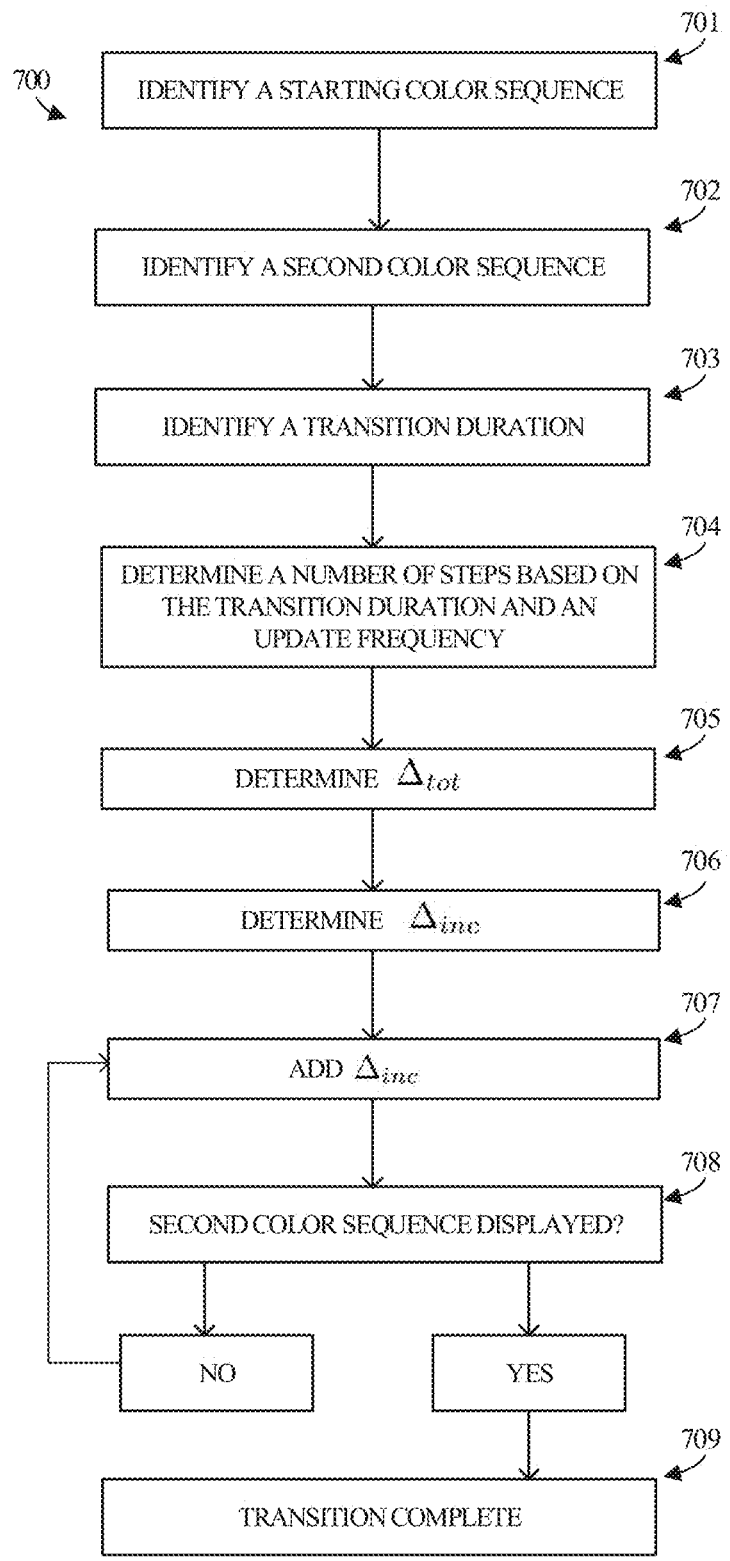
FIG. 7 is a flowchart illustrating a set of operations for transitioning from one color sequence to a sequential color sequence in accordance with some embodiments of the present technology.

FIG. 7 is a flowchart illustrating process 700 in accordance with some embodiments of the present technology related to transitioning from a first color sequence to a second color sequence. In step 701, a color control system identifies a starting color sequence. In step 702, the color control system identifies a second color sequence. In certain embodiments, the second color sequence is input by a user. In step 703, the color control system identifies a transition duration. In certain embodiments, the transition duration is input by a user. In step 704, the color control system determines a number of steps based on the transition duration and an update frequency. In some embodiments, the update frequency is the frequency is the frequency of an LED that is instructed to transition. In step 705, the color control system determines $\Delta_{tot}$ for at least one LED in a plurality of LEDs that is to display the second color sequence. In step 706, the color control system determines $\Delta_{inc}$ for the at least one LED in the plurality of LEDs. In step 707, $\Delta_{inc}$ is added to the at least one LED. In step 708, the color control sequence determines if the second color sequence is displayed. If the sequence is not yet displayed, the color control system returns to step 707. Once the second color sequence is displayed, the transition to the second color sequence is identified as complete in step 709.

In certain embodiments, the color control system determines $\Delta_{tot}$ and $\Delta_{inc}$ for each LED in the LED strip that is to display the second color sequence. In step 707, the color control system adds the $\Delta_{inc}$ corresponding to each LED to the respective LED. In this manner, the LED strip displays the second color strip across each LED of the strip upon completing the transition.

Figure 8:
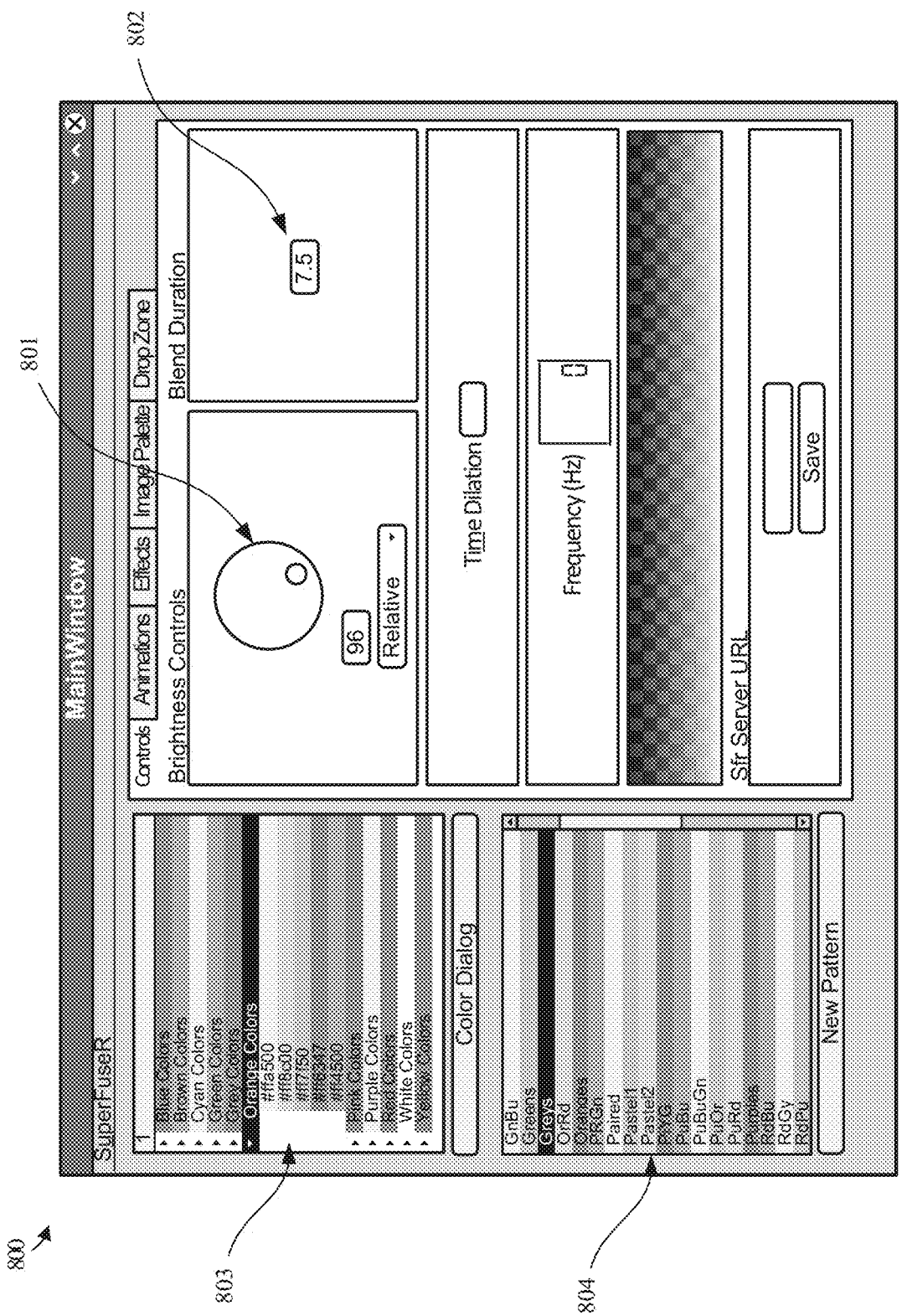
FIG. 8 illustrates an example of a user interface of an application to identify a desired color sequence in accordance with some embodiments of the present technology.

FIG. 8 illustrates an example user interface in accordance with some embodiments of the present technology. User interface 800 allows a user to adjust brightness of diodes on a diode strip with function 801. User interface 800 comprises a blend duration input 802 in which a user may input an amount of time over which to perform a transition. User interface 800 also includes color dialog 803 in which a user may select colors from when building a color sequence to display. Pattern dialog 804 allows a user to select a previously created sequence when building a color sequence to display.

Figure 9:
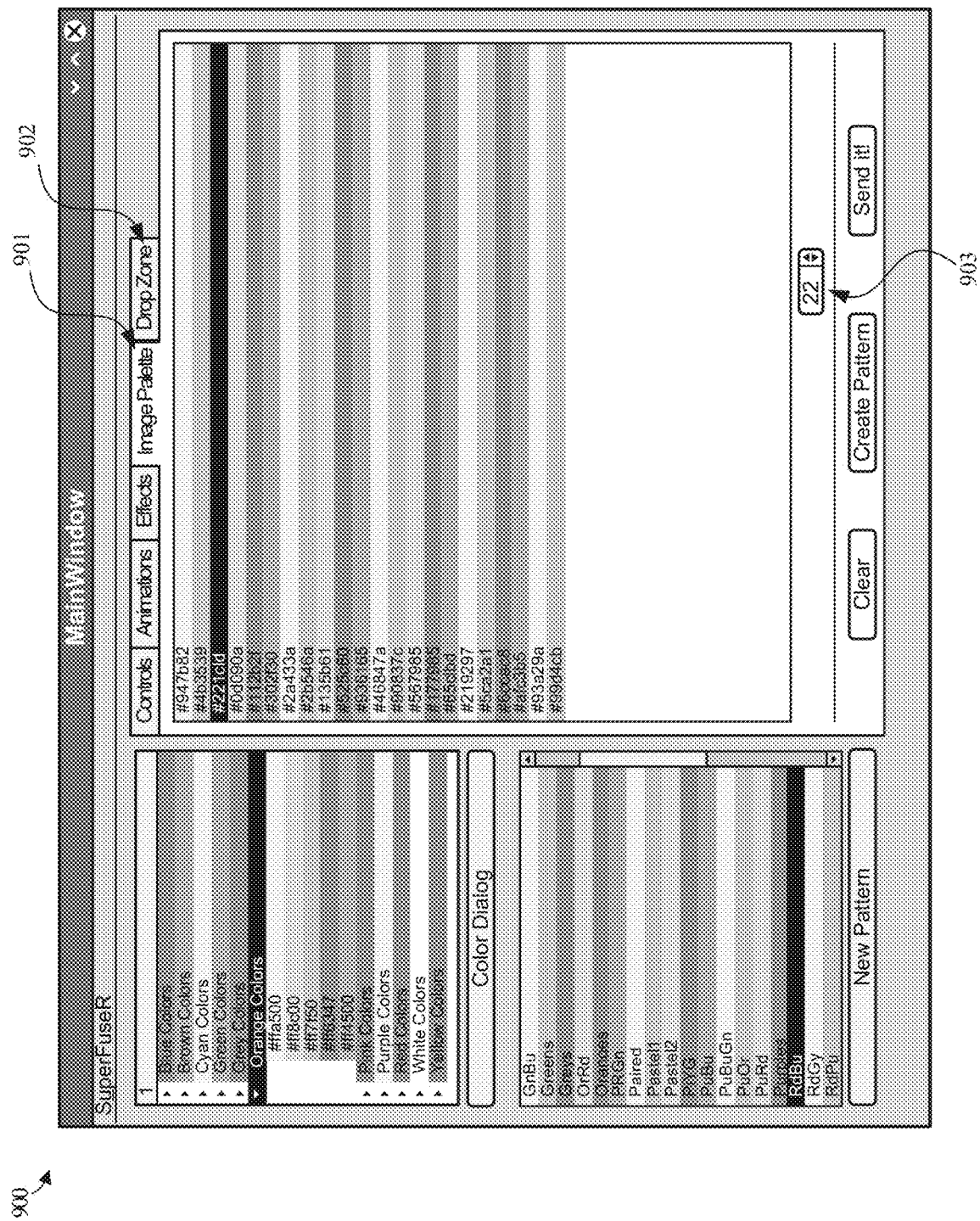
FIG. 9 illustrates an example of a user interface of an application to identify a desired color sequence in accordance with some embodiments of the present technology.

FIG. 9 illustrates an example user interface in accordance with some embodiments of the present technology. User interface 900 comprises Image Palette 901, Drop Zone 902, and number input 903. Image Palette 901 displays a number of colors taken from an input image. In certain implementations, a user may drop an image into Drop Zone 902 and input a number of colors to choose from the image in number input 903. Image Palette then displays prominent colors from the image, wherein the number of prominent colors to display is based on number input 903.

Figure 10:
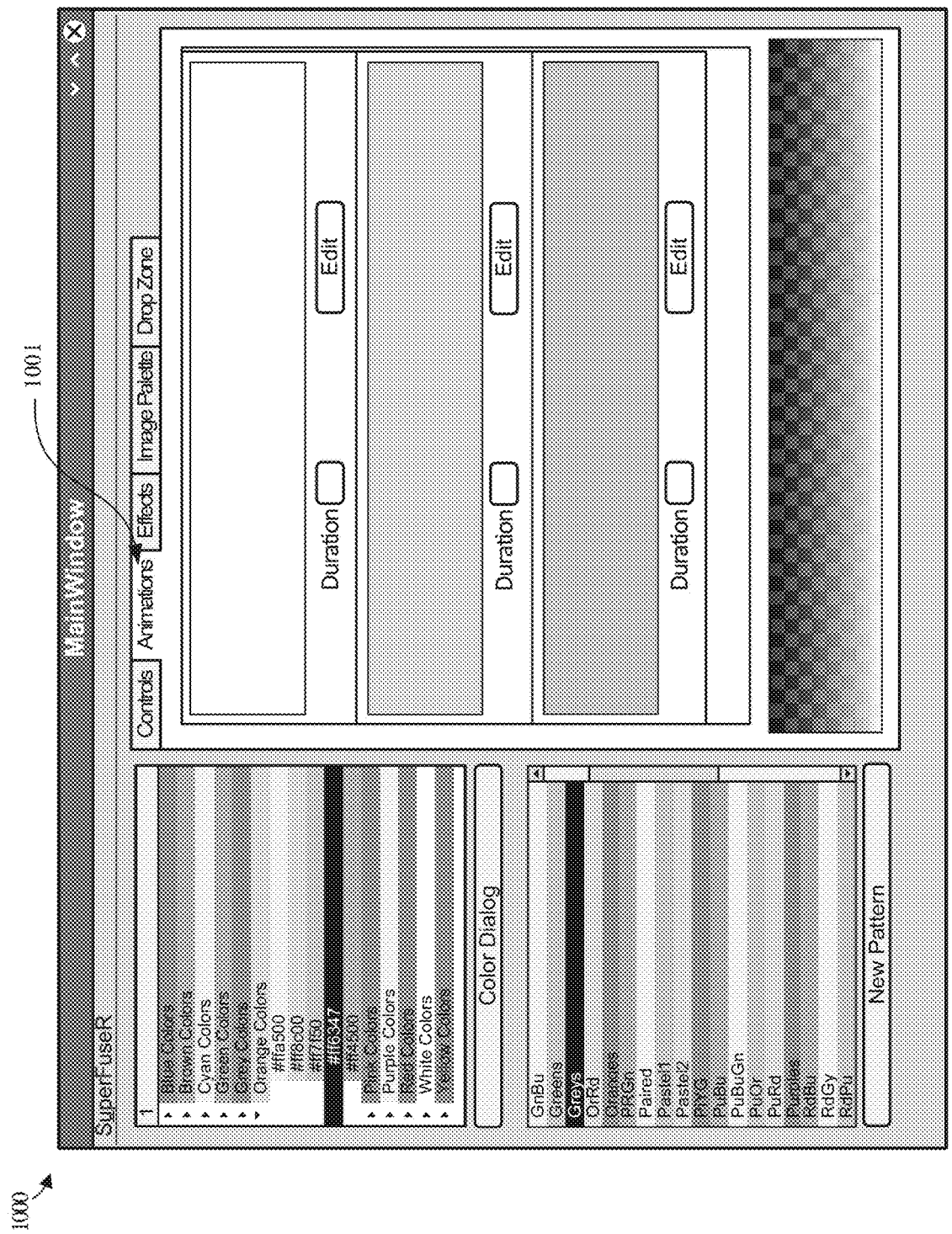
FIG. 10 illustrates an example of a user interface of an application to identify a desired color sequence in accordance with some embodiments of the present technology.

FIG. 10 illustrates an example user interface in accordance with some embodiments of the present technology. User interface 1000 comprises Animations page 1001. Animations page 1001 may include a plurality of animations with respective duration times. In the present example, an animation represents a transition from a first color sequence to a second color sequence over a specified duration that may be built and saved by a user.

Figure 11:
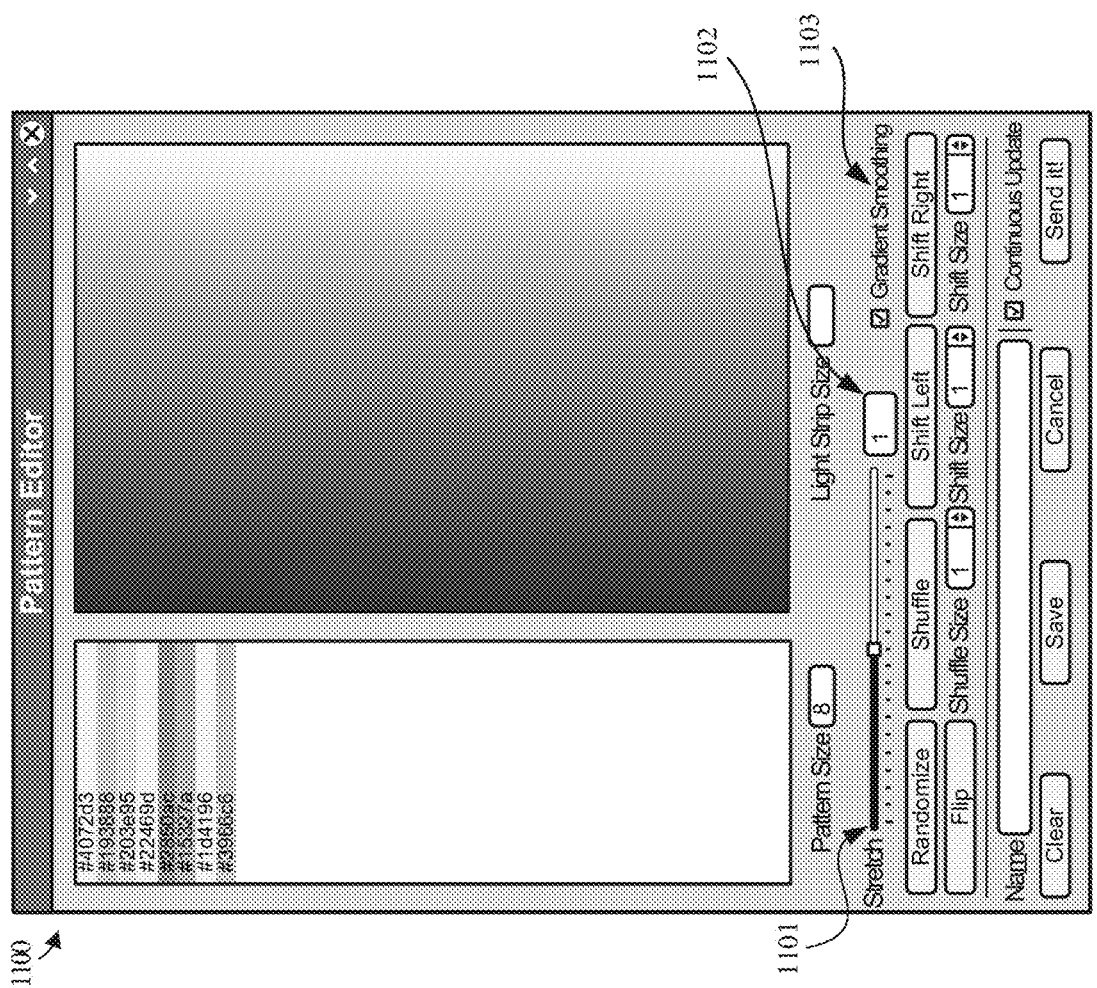
FIG. 11 illustrates an example of a user interface of an application to identify a desired color sequence in accordance with some embodiments of the present technology.

FIG. 11 illustrates an example user interface in accordance with some embodiments of the present technology. User interface 1100 comprises a stretch slider bar 1101 and stretch numerical input 1102. A user may adjust stretch slider bar 1101 or numerical input 1102 to adjust a stretch factor of the color sequence. In the present example, a stretch factor of 1 would produce the identified sequence on the identified light strip once. A lower stretch factor would repeat a sequence more than once according to the input value. A higher stretch factor would stretch the sequence such that less than its entirety is displayed by the identified light strip. Gradient smoothing feature 1103 is represented as a checkbox in FIG. 11. When gradient smoothing feature 1103 is selected, adjacent colors in a sequence may be displayed with a smooth gradient of the two colors between them, as described herein.

Figure 12:
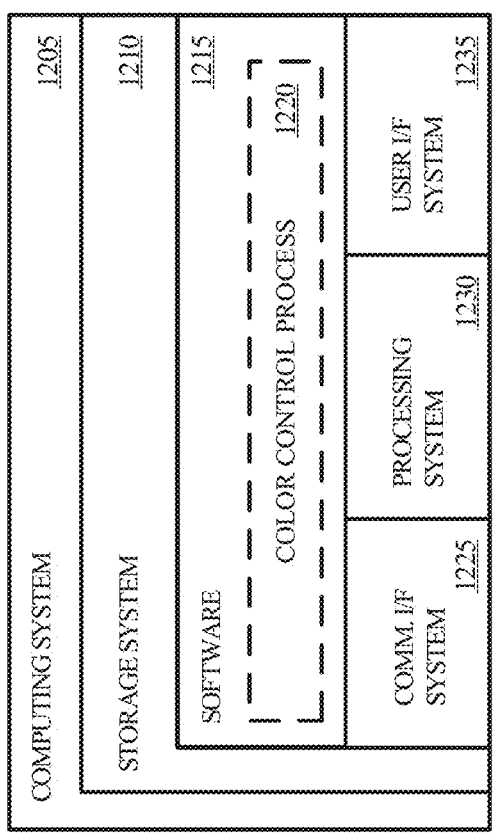
FIG. 12 illustrates an example of a computing system in which some embodiments of the present technology may be utilized.

FIG. 12 illustrates an example of a computing environment that may be used in accordance with some implementations of the present technology. In some implementations, computing system 1205 is representative of color control system 101. Computing system 1205 includes, but is not limited to, storage system 1210, software 1215, color control process 1220, communication interface system 1225, processing system 1230, and user interface system 1235 (optional). Processing system 1230 is operatively coupled with storage system 1210, communication interface system 1225, and user interface system 1235. In some implementations, software 1215 is representative color control application 102. Additionally, color control process 1220 may be representative of color control process 103.

Computing system 1205 is representative of any system or collection of systems in which the various processes, programs, services, and scenarios disclosed herein may be implemented. Examples of computing system 1205 include, but are not limited to, desktop computers, laptop computers, server computers, routers, web servers, cloud computing platforms, and data center equipment, as well as any other type of physical or virtual server machine, physical or virtual router, container, and any variation or combination thereof.

Computing system 1205 may be implemented as a single apparatus, system, or device or may be implemented in a distributed manner as multiple apparatuses, system, or devices. Computing system may communicate with one or more light strips, or one or more additional processors in communication with one or more light strips, via communication interface system 1225. Computing system 1205 could be representative of a general use computer, mobile device, stand-alone device, computer chip, as well as any other computing device capable of loading and executing software 1215.

Processing system 1230 loads and executes software 1215 from storage system 1210. Software 1215 includes and implements color control process 1220, which is representative of the color control processes discussed with respect to the preceding Figures. When executed by processing system 1230 to provide colored light sequences, software 1215 directs processing system 1230 to operate as described herein for at least the various processes, operational scenarios and sequences discussed in the foregoing implementations. Computing system 1205 may optionally include additional devices, features, of functionality not discussed for purposes of brevity.

Referring still to FIG. 12, processing system 1230 may comprise a micro-processor and other circuitry that retrieves and executes software 1215 from storage system 1210. Processing system 1230 may be implemented within a single processing device but may also be distributed across multiple processing devices or sub-systems that cooperate in executing program instructions. Examples of processing system 1230 include general purpose central processing units, graphical processing units, application specific processors, and logic devices, as well as any other type of processing device, combinations, or variations thereof.

Storage system 1210 may comprise any computer readable storage media readable by processing system 1230 and capable of storing software 1215. Storage system 1210 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 1210 may also include computer readable communication media over which at least some of software 1215 may be communicated internally or externally. Storage system 1210 may be implemented as a single storage device but may also be implemented across multiple storage devices or sub-systems co-located or distributed relative to each other. Storage system 1210 may comprise additional elements, such as a controller, capable of communicating with processing system 1230 or possibly other systems.

Software 1215 (including color control process 1220) may be implemented in program instructions and among other functions may, when executed by processing system 1230, direct processing system 1230 to operate as described with respect to the various operational scenarios, sequences, and processes illustrated herein. For example, software 1215 may include program instructions for implementing a color control process, sequence generation process, transitional process, or other processes as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1215 may include additional processes, programs, or components, such as operating system software, virtualization software, or other application software. Software 1215 may also comprise firmware or some other form of machine-readable processing instructions executable by processing system 1230. In certain embodiments, software 1215 is representative of a stand-alone application, web-based application, mobile application, as well as other forms of applications capable of running color control process 1220.

In general, software 1215 may, when loaded into processing system 1230 and executed, transform a suitable apparatus, system, or device (of which computing system 1205 is representative) overall from a general-purpose computing system into a special-purpose computing system customized to provide color control processes as described herein. Indeed, encoding software 1215 on storage system 1210 may transform the physical structure of storage system 1210. The specific transformation of the physical structure may depend on various factors in different implementations of this description. Examples of such factors may include, but are not limited to, the technology used to implement the storage media of storage system 1210 and whether the computer-storage media are characterized as primary or secondary storage, as well as other factors.

For example, if the computer readable storage media are implemented as semiconductor-based memory, software 1215 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1225 may include communication connections and devices that allow for communication with other computing systems (not shown) over communication networks (not shown). Examples of connections and devices that together allow for inter-system communication may include network interface cards, antennas, power amplifiers, radio-frequency circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 1205 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein,"

"above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further, any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method comprising:
    identifying a first color to produce, at a first time, in a first diode of a string of diodes;
    identifying a second color to produce, at the first time, in a second diode of the string of diodes, wherein the second color is distinct from the first color and there are one or more intermediate diodes between the first diode and the second diode;
    determining an intermediate color corresponding to each of the one or more intermediate diodes based on factors, the factors comprising:
        a number of diodes in the one or more intermediate diodes; and
        a difference between the first color and the second color; and
    causing the first diode to produce the first color at the first time, the second diode to produce the second color at the first time, and each of the one or more intermediate diodes to produce the intermediate color corresponding to that intermediate diode at the first time.

2. The method of claim 1, wherein the method further comprises:
    identifying a subsequent color to produce, at a second time, in the first diode of the string of diodes;
    determining one or more transition colors based on subsequent factors comprising a difference between the subsequent color and a present color of the first diode; and
    causing the first diode to transition from producing the present color at the first time to producing the subsequent color at the second time, wherein to transition from producing the present color to producing the subsequent color, the first diode produces the one or more transition colors prior to producing the subsequent color.

3. The method of claim 1, wherein each diode of the string of diodes is a light emitting diode.

4. The method of claim 1, wherein each diode of the string of diodes is a laser diode.

5. The method of claim 1, wherein the factors further comprise a desired gradient between the first color and the second color.

6. The method of claim 5, wherein the desired gradient comprises one of a linear gradient and a non-linear gradient.

7. The method of claim 1, wherein:
    identifying the first color for the first diode comprises identifying red-green-blue (RGB) values for the first diode; and
    causing the first diode to produce the first color comprises instructing the first diode to emit red, green, and blue light according to the RGB values.

8. The method of claim 1, wherein identifying the first color and the second color comprises extracting colors from an input image.

9. A computer apparatus comprising:
one or more computer readable media;
a processing system operatively coupled with the computer readable media; and
program instructions stored on the computer readable media that, when read and executed by the processing system, direct the computing apparatus to at least:
identify a first color to produce, at a first time, in a first diode of a string of diodes;
identify a second color to produce, at the first time, in a second diode of the string of diodes, wherein the second color is distinct from the first color and there are one or more intermediate diodes between the first diode and the second diode;
determine an intermediate color corresponding to each of the one or more intermediate diodes based on factors, the factors comprising:
a number of diodes in the one or more intermediate diodes; and
a difference between the first color and the second color; and
cause the first diode to produce the first color at the first time, the second diode to produce the second color at the first time, and each of the one or more intermediate diodes to produce the intermediate color corresponding to that intermediate diode at the first time.

10. The computing apparatus of claim 9, wherein the program instructions further direct the computing apparatus to at least:
identify a subsequent color to produce, at a second time, in the first diode of the string of diodes;
determine one or more transition colors based on subsequent factors comprising a difference between the subsequent color and a present color of the first diode; and
cause the first diode to transition from producing the present color at the first time to producing the subsequent color at the second time, wherein to transition from producing the present color to producing the subsequent color, the first diode produces the one or more transition colors prior to producing the subsequent color.

11. The computing apparatus of claim 9, wherein each diode of the string of diodes is a light emitting diode.

12. The computing apparatus of claim 9, wherein each diode of the string of diodes is a laser diode.

13. The computing apparatus of claim 9, wherein the factors further comprise a desired gradient between the first color and the second color.

14. The computing apparatus of claim 13, wherein the desired gradient comprises a linear gradient.

15. The computing apparatus of claim 13, wherein the desired gradient comprises a non-linear gradient.

16. The computing apparatus of claim 9, wherein to identify the first color and the second color, the program instructions direct the computing apparatus to extract colors from an input image.

17. A system comprising:
a string of light emitting diodes (LEDs); and
a controller operatively coupled to the string of LEDs, wherein the controller is configured to:
identify a first color to produce, at a first time, in a first LED of the string of LEDs;
identify a second color to produce, at the first time, in a second LED of the string of LEDs, wherein the second color is distinct from the first color and there are one or more intermediate LEDs between the first LED and the second LED;
determine an intermediate color corresponding to each of the one or more intermediate LEDs based on factors, the factors comprising:
a number of LEDs in the one or more intermediate LEDs; and
a difference between the first color and the second color; and
cause the first LED to produce the first color at the first time, the second LED to produce the second color at the first time, and each of the one or more intermediate LEDs to produce the intermediate color corresponding to that intermediate LED at the first time.

18. The system of claim 17, wherein the controller is further configured to:
identify a subsequent color to produce, at a second time, in the first LED of the string of LEDs;
determine one or more transition colors based on subsequent factors comprising a difference between the subsequent color and a present color of the first LED; and
cause the first LED to transition from producing the present color at the first time to producing the subsequent color at the second time, wherein to transition from producing the present color to producing the subsequent color, the first LED produced the one or more transition colors prior to producing the subsequent color.

19. The system of claim 18, wherein causing the first LED to transition from producing the present color to producing the subsequent color is based on an identified transition duration.

20. The system of claim 17, wherein the factors further comprise a desired gradient.

* * * * *